United States Patent [19]
Ikedea

[11] Patent Number: 5,664,201
[45] Date of Patent: Sep. 2, 1997

[54] DRIVE CONTROL SYSTEM FOR MICROPROCESSOR ACCORDING TO OPERATIONAL STATE AND AMBIENT TEMPERATURE CONDITION THEREOF

[75] Inventor: Osamu Ikedea, Tokyo, Japan

[73] Assignee: Dia Semicon Systems Incorporated, Tokyo, Japan

[21] Appl. No.: 46,072

[22] Filed: Apr. 12, 1993

[30] Foreign Application Priority Data

Apr. 16, 1992  [JP]  Japan .................................. 4-096780

[51] Int. Cl.⁶ ................................. G06F 13/00
[52] U.S. Cl. ............... 395/750.03; 364/707; 395/750.04
[58] Field of Search ............................ 395/750, 800; 364/707

[56] References Cited

U.S. PATENT DOCUMENTS

| | | | |
|---|---|---|---|
| 5,167,024 | 11/1992 | Smith et al. | 395/375 |
| 5,222,239 | 6/1993 | Rosch | 395/750 |
| 5,230,055 | 7/1993 | Katz et al. | 395/750 |
| 5,230,074 | 7/1993 | Canova, Jr. et al. | 395/750 |
| 5,239,652 | 8/1993 | Seibert et al. | 395/750 |
| 5,349,688 | 9/1994 | Nguyen | 395/800 |
| 5,355,501 | 10/1994 | Gross et al. | 395/750 |
| 5,396,635 | 3/1995 | Fung | 395/800 |
| 5,416,726 | 5/1995 | Garcia-Duarte et al. | 364/550 |

*Primary Examiner*—Jack B. Harvey
*Assistant Examiner*—John Travis
*Attorney, Agent, or Firm*—Barnes & Thornburg

[57] ABSTRACT

A drive control system for a microprocessor comprises a switching circuit 5 for varying a drive condition of the microprocessor by varying a processing speed and a power consumption in mutually related manner, an operational state dependent control portion including a status judgment circuit 7, an address monitoring circuit 8, and an address detecting circuit 9, for monitoring the operational state of the microprocessor and controlling the switching circuit 5 for adapting the processing speed to the operational state, and a temperature dependent control portion comprising a temperature sensor 10 and a comparator 11, for lowering the power consumption of the microprocessor when the temperature condition of the microprocessor higher than a predetermined criterion temperature is detected.

3 Claims, 2 Drawing Sheets

DRIVE CONTROL SYSTEM FOR MICROPROCESSOR ACCORDING TO OPERATIONAL STATE AND AMBIENT TEMPERATURE CONDITION THEREOF

BACKGROUND OF THE INVENTION

1. Field of the Invention

The present invention relates generally to a microprocessor based equipment, such as a battery operated portable personal computer. More specifically, the invention relates to a drive control system for optimally controlling a driving condition of a microprocessor depending upon operational state thereof.

2. Description of the Related Art

As disclosed in Japanese Unexamined Patent Publication (Kokai) No. 2-178818, for example, power saving control is well-known in the art to interrupt power supply to those section of a computer system which are not executing any substantial task for reducing total power consumption of the computer system. Such technology has already been applied to field products. In the field of battery-operated personal computers including a lap-top computer, much study has been given in the power saving technology of this type in the sake of maximizing the system uptime with a smaller and lighter battery.

Conventionally, two types of functions for placing the personal computer into a stand-by state, i.e. so-called a rest mode function and a sleep mode function are provided in certain types of personal computer systems. The rest mode function is performed for automatically switching an operational clock frequency of the computer system from 16 Mhz in the normal operational mode to 1 Mhz when a CPU is held inoperative state for a predetermined period of time. If a further predetermined period is elapsed while the computer system is held in the rest mode state, the sleep mode is automatically initiated to shut down the power supply. In either mode of operation of the computer system, the normal mode operation can be resumed by operating an arbitrary key. In many cases, the predetermined period of time for initiating the stand-by mode can be arbitrary set by the user through manual setting operation.

As can be appreciated, conventionally, the computer system is situated into the power saving state (i.e. the above-mentioned stand-by mode) in terms that "the CPU is held substantially inoperative state for a predetermined period of time". In practice, the operational state of the computer system is changed over from the normal state into the power saving state in absence of any external factor for initiating substantial task of the CPU, such as input through entry from a keyboard or from a communication supervisory system or so forth, for the predetermined period of time.

In general, while the personal computer is executing an application software, such as a Japanese wordprocessor, a table calculation or so forth, the process speed of the modern and high performance microprocessor (CPU) is much higher than entry speed of the operation through a keyboard. Therefore, in the CPU operation, the CPU frequently falls into a substantial waiting state, in which a trigger factor for performing next task is waited. Even though each individual period where the CPU is situated in the substantial waiting state is relatively short, accumulation of such period over total operation period of the personal computer becomes substantial. Therefore, if the CPU is switched into the power saving state, in which the power consumption and the processing speed of the CPU is relatively low, by detecting the substantial waiting state, substantial effect in saving power consumption can be achieved.

On the other hand, saving of the power consumption in the microprocessor is effective not only for expanding available period of a battery in the battery operated personal computer but also for reducing heat to be generated in the microprocessor based equipment. Namely, greater performance and higher processing speed in the microprocessor requires higher power consumption. Higher consumption naturally results in generation of greater amount of heat to induce a potential overheating problem. Therefore, in designing a notebook type personal computer, an electronic pocketbook or so forth, it is important task to consider the installation design with taking a heat radiation into account in order to avoid overheating of components which generate heat. Naturally, by employing sufficient capacity of radiation fan or radiation fin, the overheating problem in the elements can be successfully avoided. However, on the other hand, the large capacity fan or fin requires substantial space for installation and causes substantial increase of the weight and thus serve for burdening down-sizing of the overall size and reduction of the weight of the equipments, such as the notebook type personal computer, the electronic pocket book or so forth.

SUMMARY OF THE INVENTION

Therefore, it is an object of the present invention to provide a drive control system for a microprocessor which can reduce unnecessary power consumption without requiring substantial drop of operational performance of the microprocessor.

Another object of the present invention is to provide a drive control system for a microprocessor, which can successfully avoid overheating of the microprocessor.

According to one aspect of the invention, a drive control system for a microprocessor comprises:

a drive condition varying means for varying a drive condition of the microprocessor for varying a processing speed and a power consumption in mutually related manner;

an operational state dependent control means for monitoring operational state of the microprocessor and controlling the drive condition varying means for adapting the processing speed to the operational state; and a temperature dependent control means for monitoring a temperature condition of the microprocessor for overriding the operational state dependent control means for lowering the power consumption of the microprocessor when the temperature condition of the microprocessor higher than a predetermined criterion temperature is detected.

In the preferred construction, the operational state dependent control means normally operates the drive condition varying means at a first mode, in which the processing speed and the power consumption is higher, and is responsive to a substantial rest state of the microprocessor to switch the drive condition varying means to a second mode, in which the processing speed and the power consumption is lower. In this case, the operational state dependent control means monitors address transition in address access of the CPU within a predetermined period at predetermined address resolution and for detecting the substantial rest state of the microprocessor by detecting a repeated access state of the CPU, in which a specific address group is repeatedly accessed.

According to another aspect of the invention, a power saving control system for a computer system including a CPU, comprises:

first means for selectively operating the CPU in a first mode with relatively high performance and high power consumption and a second mode with relatively low performance and low power consumption;

second means for monitoring addresses accessed by the CPU over a given period in order to detect a predetermined operational state of the CPU, in which only specific address group is repeatedly accessed;

third means associated with the first means for normally operating the first means in the first mode and responsive to the second means detecting the predetermined operational state, for operating the first means in the second mode as long as the predetermined operational state is maintained; and fourth means for monitoring a temperature condition of the microprocessor for overriding the third means for lowering the power consumption of the microprocessor irrespective of the operational state of the microprocessor when the temperature condition of the microprocessor higher than a predetermined criterion temperature is detected.

In the preferred construction, the second means monitors addresses accessed by the CPU by periodically varying the given period. Practically, the second means may be operable in a learning mode in a given learning period which forms a former part of the given period, for recording addresses accessed by the CPU and a comparison mode in a given comparison period which forms a latter part of the given period, for comparing a currently accessed address with the addresses recorded during immediately preceding learning mode operation. In this case, the second means may update the given learning period at the end of the comparison mode operation and derive the given comparison period in relation to the updated learning period. Preferably, the second means varies the given learning period within a range defined by upper and lower limit values. Exemplarily, the second means initially sets the given learning period at the lower limit value and updates the learning period by adding a predetermined additional period unit to the instantaneous learning period at every end of the comparison mode operation.

According to a further aspect of the invention, a power saving control system for a computer system including a CPU, comprises:

an operational mode switching means for switching operational mode of the CPU between a normal mode, in which power consumption is relatively large, and a power saving mode, in which the power consumption is relatively small;

a repeated access detecting means for monitoring address transition in address access of the CPU within a predetermined period at predetermined address resolution and for detecting a repeated access state of the CPU, in which a specific address group is repeatedly accessed;

an operational state dependent control means responsive to the repeated access detecting means detecting the repeated access state while the CPU is in the normal mode for switching the operational mode of the CPU to the power saving mode; and a temperature dependent control means for monitoring a temperature condition of the microprocessor for overriding the operational state dependent control means for lowering the power consumption of the microprocessor irrespective of the operational state of the microprocessor when the temperature condition of the microprocessor higher than a predetermined criterion temperature is detected.

Preferably, the repeated access detecting means periodically varies the address resolution in monitoring address access transition.

It is further desirable that the power saving control system further comprises an inhibiting means for inhibiting operation of the operational state dependent control means for switching the operational mode from the normal mode to the power saving mode when the operational state of the CPU satisfies a predetermined inhibiting condition.

Practically, the inhibiting means may inhibit switching operation of the operational state dependent control means when the address of the software interruption vector for receiving keyboard entry is accessed within an immediately preceding predetermined period, when an address of the software interruption for checking the keyboard entry is not accessed in over a given period in the past, or when an address assigned as a video memory space is being accessed.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention but are for explanation and understanding only.

DESCRIPTION OF THE PREFERRED EMBODIMENT

Figure 1:
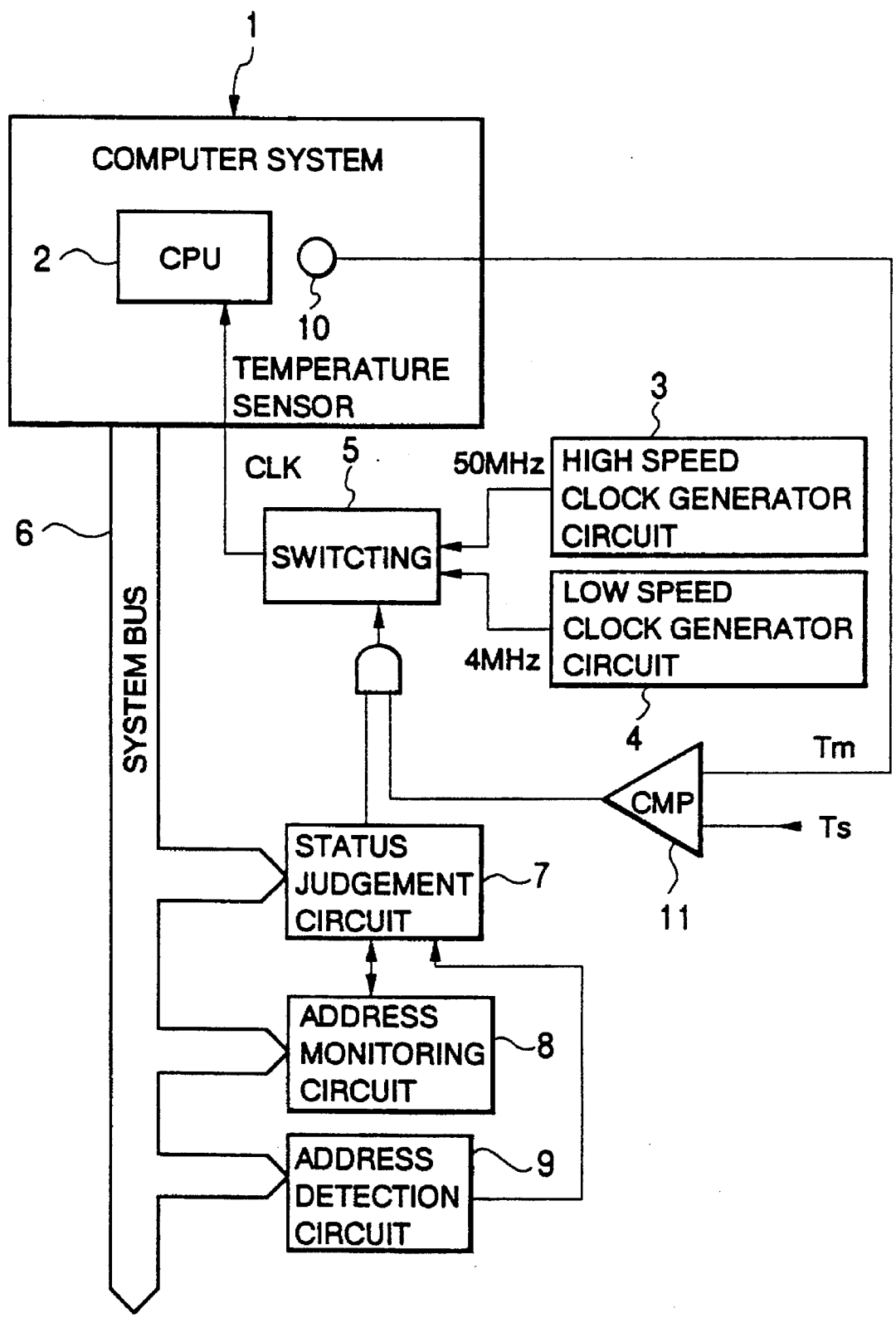
FIG. 1 is a schematic block diagram of the preferred embodiment of a power saving control system for a computer system according to the present invention.

Referring now to the drawings, particularly to FIG. 1, the preferred and exemplary embodiment of a drive control system for a microprocessor is illustrated schematically. It should be noted that the general concept of drive control for the microprocessor and the general construction of the system relevant to the present invention has been disclosed in the commonly owned co-pending U.S. patent application Ser. No. 07/886,649, filed on May 20, 1992, now U.S. Pat. No. 5,430,881, which is, in turn, a continuation-in-part Application of U.S. patent application Ser. No. 07/735,382, filed on Jul. 24, 1991, now abandoned and counterpart European Patent Application is also pending under Application Ser. No. 92906159.6, filed on Feb. 27, 1992. The disclosures of the above-identified related applications are herein incorporated by reference.

For the purpose of disclosure, the shown embodiment of the power saving control system is adapted for application to a so-called notebook-type personal computer, installed therein Intel 80486SX microprocessor. However, it should be appreciated that the above-identified specific computer system is not intended to be specific for the present invention but can be of any types of computer systems.

Power consumption in operation of a computer system 1 installed therein the microprocessor, i.e. CPU 2, is variable by varying a frequency of a CPU clock to be applied to the CPU. In the shown embodiment, the CPU is operated in a normal mode (high speed mode) in which power consumption is relatively high, and a power saving mode (low speed mode) in which power consumption is relatively low, by switching the CPU clock frequency. For providing different frequency of CPU clocks, the shown embodiment of the power saving control system includes a high speed clock generator circuit 3 which generates a high speed clock of a predetermined higher frequency, e.g., 50 MHz, and a low speed clock generator circuit 4 which generates a low speed clock of a predetermined lower frequency, e.g. 4 MHz. A switching circuit 5 is provided for selectively supplying one of the high speed clock and the low speed clock to the CPU of a computer system 1.

The shown embodiment of the drive control system also includes a status judgement circuit 7, an address monitoring circuit 8 and an address detecting circuit 9, which are connected to a system bus 6 of the computer system 1. These circuit components are adapted to perform monitoring of operation of the computer system and power saving control. The address monitoring circuit 8 is associated with the status judgement circuit 7 so that it is selectively operated in an address storage mode and an address comparison mode depending upon a control signal from the latter. In the address storage mode, the content of storage is initially cleared and, subsequently, addresses accessed by the CPU of the computer system are stored with an appropriate address resolution. Namely, when the CPU accesses a certain address, "1" is set in a corresponding memory cell in the address monitoring circuit 8. A group of addresses stored in the address storage mode will be hereinafter referred to as "learnt address". In the address comparison mode operation of the address monitoring circuit 8, the address currently accessed by the CPU is compared with the learnt addresses in order. If the currently accessed address is other than the learnt addresses, an unmatching signal is output to the status judgement circuit 7.

Further discussion will be given herebelow in terms of an application of the shown embodiment of the drive control system according to the invention for the computer system 1, on which MS-DOS is active as an operating system. It should be noted that although the specific example will be discussed herebelow, the shown embodiment of the drive control system according to the present invention is applicable for any computer systems which are active with various operating systems. In the exemplary application, any MS-DOS application programs active in a real mode on 80486SX CPU, an interruption vector table are assigned to specific address. For this interruption vector table, a software interruption function for obtaining input data in response to an entry through a keyboard and a software interruption function for checking if the entry through the keyboard is present or not, are provided. The address detecting circuit 9 in FIG. 1 is a circuit for individually detecting access of two software interruption vectors in the interruption vector table for generating an address detection signal. The address detection signal is utilized by the status judgement circuit 7 in a manner set out below.

In addition to the foregoing construction, an indicator circuit may be provided for indicating the CPU operation in the power saving mode. In such case, the switching signal for switching operation mode output from the status judgement circuit is also input to an indicator circuit. The indicator circuit is responsive to the switching signal to maintain a LED indicator OFF during the normal mode operation of the CPU and ON during the power saving mode operation of the CPU. The LED indicator may be arranged on a housing of the computer system together with a power indicator lamp, a RAM drive access indicator lamp, a hard disk access indicator lamp or so forth. The detail of the power saving control system incorporating the indicator circuit has been disclosed in the co-pending U.S. Patent Application for "Power Saving Control System for Computer System" commonly owned by the owner of the present invention. The disclosure of the above-identified commonly owned co-pending U.S. Patent Application is herein incorporated by reference.

Figure 2:
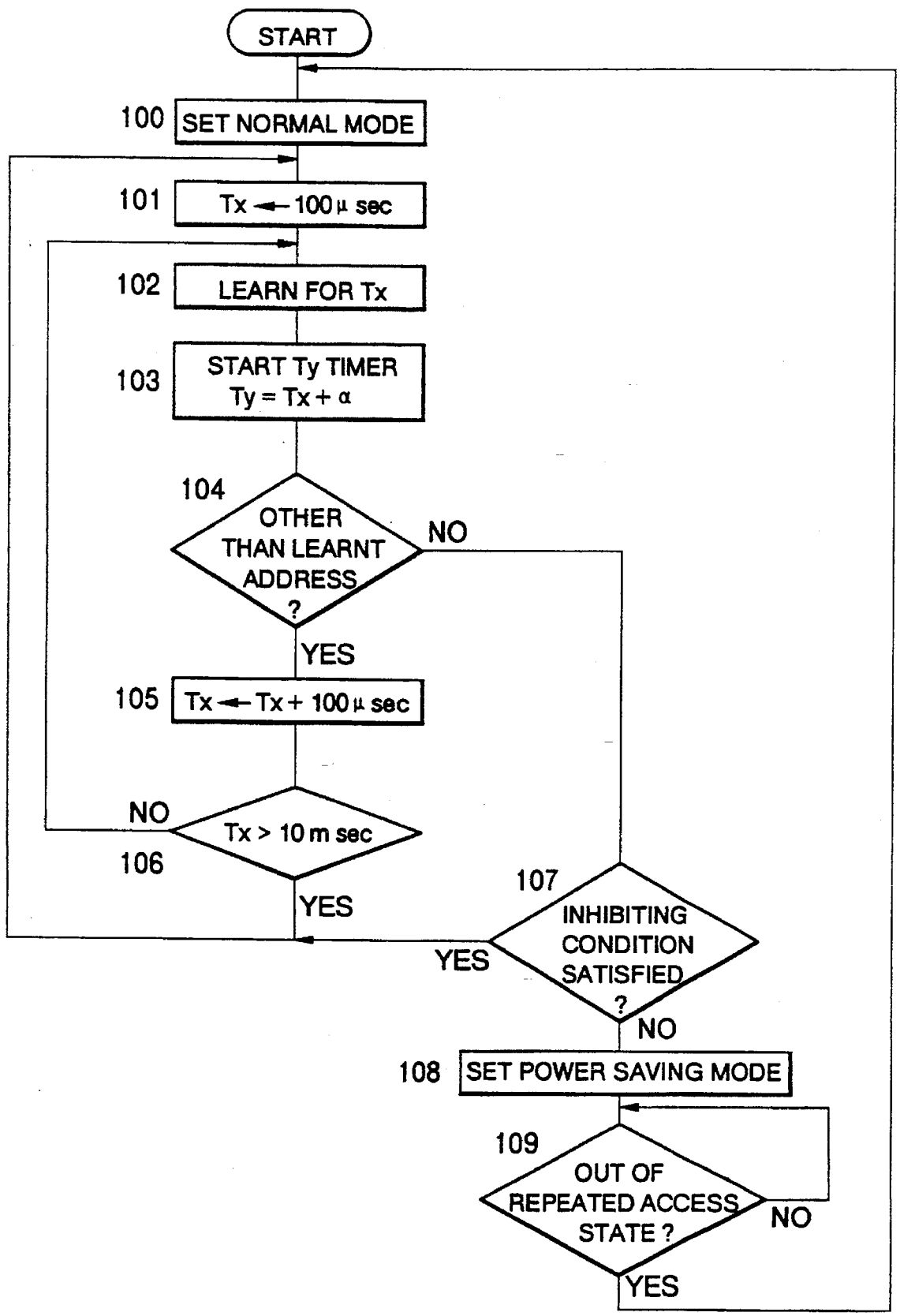
FIG. 2 is a flowchart showing a process of operation of a status judgement and power saving controller in the power saving control system of FIG. 1.

Processes of status monitoring and power saving control of the computer system 1 to be performed by the status judgement circuit 7 is illustrated in a form of flowchart in FIG. 2.

As shown in FIG. 2, at the initial step 100 the computer system 1 is set for the normal mode operation, in which the high speed clock, e.g. 50 MHz clock, is supplied to the CPU for normal operation thereof. Then, at a step 101, a learning period Tx is set at a lower limit value, e.g. 100 μsec. Subsequently, at a step 102, the address monitoring circuit 8 is cleared or reset. Thereafter, at the step 102, the address storage mode operation of the address monitoring circuit 8 is initiated for the learning period Tx. By this, address blocks accessed by CPU during the learning period Tx is stored in the address monitoring circuit 8, to establish the learnt address.

At a step 103, a timer is started to measure a monitoring period Ty which is set depending upon the learning period Tx but longer than the learning period Tx. During the monitoring period Ty, the address monitoring circuit 8 operates in the comparison mode. The address monitoring circuit 8 acting in the comparison mode checks whether the CPU accesses an address other than those in the learnt addresses during the monitoring period Ty measured by the timer (steps 103 and 104). If the address other than the learned addresses is accessed within the monitoring period Ty, the process is advanced from the step 104 to a step 105. In the step 105, the learning period Tx is updated by adding 100 μsec. to the current value of the learning period Tx. Subsequently, at a step 106, check is performed if the Tx updated at the step 105 exceeds a predetermined upper limit value, e.g. 10 msec. If the updated Tx period is smaller than the upper limit value, e.g. 10 msec., the process is returned to the step 102 to re-start learning mode operation. On the other hand, if the updated Tx is greater than or equal to the upper limit value, the process is returned to the step 101 so that the learning period Tx is set at the lower limit value e.g. 100 μsec.

Through the foregoing steps 100–106, the learning process at the step 102 and the monitoring process at the steps 103, 104, 105 are repeated with gradually increasing the learning period Tx and the monitoring period Ty from the lower limit value to the upper limit value, to detect a repeated access state, in which "no address other than the learnt addresses is accessed within the monitoring period Ty".

When the repeated access state, in which "no address other than the learnt addresses is accessed within the monitoring period Ty" is detected, the process is advanced from the step 104 to a step 107 to perform judgement whether the status of the computer system 1 is matched with the following inhibiting conditions. If the status of the computer system does not match with any of the inhibiting conditions, the process is advanced to a step 108. At the step 108, the switching circuit 5 is switched over so that the low speed clock, e.g. 4 MHz clock, from the low speed clock generator circuit 8 is supplied to the CPU to operate the latter in the power saving mode. Subsequently, at a step 109, check is performed if the CPU moves out of the repeated access state or not. If the CPU status out of the repeated access state is detected, the process returns to the initial step 100 so that the high speed clock, e.g. 50 MHz clock, from the high speed clock generator 3 is supplied to the CPU to operate the latter in the normal mode.

It should be noted that the inhibiting conditions to be set in the step 107 may be, for example, (1) when the address of the software interruption vector for receiving keyboard entry is accessed within an immediately preceding predetermined period, (2) when an address of the software interruption for checking the keyboard entry is not accessed in over a given period in the past, and (3) when an address assigned as a video memory space is being accessed.

On the other hand, at the step 109, moving out of the repeated access state is practically detected in the following manner. By operating the address monitoring circuit 8 in the comparison mode, continuous check is performed whether the address other than the learnt address is performed. When the address other than the learnt address is accessed, judgement is made that the CPU moves out of the repeated access state. Also, even when no address other than the learnt address is accessed, judgement is made that the repeated access state is terminated when the address of the software interruption vector for reading in the keyboard entry is accessed.

As set forth above, the operational state where the CPU repeatedly access a certain group of addresses within a given period less than or equal to approximately 20 msec., is detected so that the CPU is operated in the power saving mode during the period that the repeated access state is continuously detected except for the case where the above-mentioned inhibiting conditions are established. By this, in the operating state of typical MS-DOS or its applications, the power saving period frequently appears in a range of 10 msec. to several sec. to achieve substantial power saving without substantially lowering the processing performance of the computer system.

The effect of the shown embodiment will be discussed in comparison with the function in the prior art.

As set forth above, in the prior art, the computer system is situated into the power saving state (i.e. the above-mentioned stand-by mode) in terms that "the CPU is held substantially inoperative state for a predetermined period of time". In practice, the operational state of the computer system is changed over from the normal state into the power saving state in absence of any external factor for initiating substantial task of the CPU, such as input through entry from a keyboard or from a communication supervisory system or so forth, for the predetermined period of time. In general, the CPU is regarded as being in a substantial rest state when the above-mentioned factor to cause substantial task is absent for the predetermined period of time. With the conventional technology, in which the foregoing substantial rest state of the CPU is detected to change over the operational mode into the power saving mode, however, such procedure may not achieve sufficient power saving because it requires to set the predetermined period of time more than several tens seconds for typical personal computer. For instance, it is assumed that a word processing application is active in the personal computer. In this case, every entry through the keyboard serves as the factor for causing initiation of the task in the CPU. In response to each input signal, the CPU performs various tasks including very simple tasks, such as displaying a character on a display screen, slightly time-consuming tasks, such as conversion of Kana entry into Kanji character or moving of a document and time-consuming tasks, such as sorting of files or so forth. When an operator is drafting a document, he tends to have relatively long intervals between key entries for considering word, phrase or so forth. In such case, the possible interval between key entries over several tens of msec. to several sec. frequently occurs. In this circumstance, if the predetermined period of time in the conventional power saving method is set in a range of 1 sec. to several sec., the power saving mode operation can be initiated during time-consuming tasks to cause failure of the on-going task. For avoiding such possibility, it becomes necessary to set the predetermined period in a range of several tens sec. or several min. In the latter case, since power saving function is held inoperative during frequently occurring short intervals of key entry, in which the CPU is held substantially resting, so that satisfactory power saving effect cannot be achieved.

When the CPU repeatedly executes a loop type program, the addresses storing the instructions forming the loop are specific for most of the instructions. Accordingly, in the condition where the loop-type program is executed, the CPU tends to repeatedly access only specific address group. Taking the repeating cycle period as T, by monitoring access addresses of CPU for at least $(2 \times T + \alpha)$ period, the repeated access condition can be detected.

When the system is in the substantial rest state, in which the entry through the keyboard is waited, the CPU is in an operational state of repeatedly accessing the specific address group within a substantially short period. Therefore, in the shown embodiment, the operational mode of the CPU is switched from the high speed mode to the low speed mode when the repeated access state is detected within a given period which is set arbitrary and appropriately. On the other hand, when any effective task is triggered, the operational state of the CPU moves out of the substantial rest state. Then, the operational mode is switched over the high speed mode. With such arrangement, substantially short power saving periods can be frequently attained without affecting to operation of the system.

In addition to the foregoing construction, the shown embodiment is provided with a function for thermal condition dependent control. Namely, as shown in FIG. 1, a temperature sensor 10 is provided on an installation substrate of the computer system 1 in the vicinity of the CPU 2 for detecting a temperature around the CPU 2. The temperature sensor 10 outputs a temperature indicative signal representative of a detected temperature Tm. The temperature sensor 10 is connected to a comparator 11 for supplying the temperature indicative signal of Tm to one input terminal of the latter. A predetermined set temperature Ts is input to the other input terminal of the comparator 11. The comparator 11 compares the detected temperature Tm with the set temperature Ts from time to time. When the detected temperature Tm is lower than the set temperature, the output of the comparator 11 is maintained at "1". At this condition, the switching circuit is active in response to the control signal from the status judgement circuit 7. When the detected temperature Tm exceeds the set temperature Ts in some reason, the output of the comparator 11 becomes "0". The switching circuit 5 is responsive to the "0" level output of the comparator 11 to switch the switching circuit 5 over the low speed clock generator circuit 4 irrespective of the control signal from the status judgement means 7 to operate the CPU 2 in the low speed mode with the low speed clock, e.g. 4 MHz.

This means that, when the computer system 1 is placed in a high temperature environment or the CPU 2 continues high speed processing for a long period to cause abnormal rising of the temperature around the CPU 2, the operational mode of the CPU 2 is forcedly switched over the low speed mode. In such occasion, the control signal of the status judgement circuit 7 becomes null. By this, even though the processing speed is lowered, the CPU 2 may continue operation with reducing power consumption as well as the heat. This successfully prevent rising of the temperature of the CPU 2. When the output of the comparator 11 is reversed into "1" level according to lowering of the temperature around the CPU 2, the mode switching function of the status judgement circuit 7 is resumed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

For instance, while the foregoing embodiment employs a control system, in which the clock frequency is differentiated between two modes, i.e. the normal or higher clock frequency mode and the power saving mode in order to reduce power consumption, the CPU clock frequency can be differentiated into a plurality of stages, i.e. three or more stages. Also, various control systems, such as those lowering the power source voltage, intermittently operating the CPU at an appropriate interval or lowering the accessing rate of the CPU, can also be employed. These control systems may be selected depending upon application of the drive control system.

It is also possible to selectively initiate the power save mode operation depending upon the periods, in which the repeated access mode is detected. Such procedure is effective for avoiding initiation of the power save mode in certain instance, such as execution of a loop for a software timer. The process is disclosed in the co-pending U.S. Patent Application for "Power Saving Control System for Computer System with Feature of Selective Initiation of Power Saving Control" commonly owned by the owner of the present invention. The disclosure of the above-identified commonly owned co-pending U.S. Patent Application is also herein incorporated by reference.

What is claimed is:

1. A power saving control system for a computer system including a CPU, comprising:

first means for selectively operating said CPU in a first mode with relatively high performance and high power consumption and a second mode with relatively low performance and low power consumption;

second means for monitoring addresses accessed by said CPU over a given period in order to detect a predetermined operational state of said CPU, in which only specific address group is repeatedly accessed, while said given period being varied periodically, said second means being operable in a learning mode in a given learning period which forms a former part of said given period, for recording addresses accessed by said CPU and a comparison mode in a given comparison period, for comparing a currently accessed address with the addresses recorded during immediately preceding learning mode operation;

third means associated with said first means for normally operating said first means in said first mode and responsive to said second means detecting said predetermined operational state, for operating said first means in said second mode as long as said predetermined operational state is maintained; and fourth means for monitoring a temperature condition of said microprocessor for overriding said third means for lowering the power consumption of said microprocessor irrespective of the operational state of said microprocessor when the temperature condition of the microprocessor higher than a predetermined criterion temperature is detected, said second means updating said given learning period at the end of said comparison mode operation and deriving said given comparison period in relation to the updated learning period.

2. A power saving control system for a computer system including a CPU, comprising:

first means for selectively operating said CPU in a first mode with relatively high performance and high power consumption and a second mode with relatively low performance and low power consumption;

second means for monitoring addresses accessed by said CPU over a given period in order to detect a predetermined operational state of said CPU, in which only specific address group is repeatedly accessed, while said given period being varied periodically, said second means being operable in a learning mode in a given learning period which forms a former part of said given period, for recording addresses accessed by said CPU and a comparison mode in a given comparison period, for comparing a currently accessed address with the addresses recorded during immediately preceding learning mode operation;

third means associated with said first means for normally operating said first means in said first mode and responsive to said second means detecting said predetermined operational state, for operating said first means in said second mode as long as said predetermined operational state is maintained; and fourth means for monitoring a temperature condition of said microprocessor for overriding said third means for lowering the power consumption of said microprocessor irrespective of the operational state of said microprocessor when the temperature condition of the microprocessor higher than a predetermined criterion temperature is detected, said second means varying said given learning period within a range defined by upper and lower limit values.

3. A power saving control system as claimed in claim 2, wherein said second means initially sets said given learning period at said lower limit value and updates said learning period by adding a predetermined additional period unit to the instantaneous learning period at every end of said comparison mode operation.

* * * * *